(12) United States Patent
Dubé

(10) Patent No.: US 6,644,465 B1
(45) Date of Patent: Nov. 11, 2003

(54) CONVEYOR ROLLER NIP POINT AUTOMATIC PROTECTION DEVICE

(76) Inventor: Bert Y. Dubé, 286 Beaver Ave. R.R. #15 Site 6-43, Thunder Bay, Ont. (CA), P7B 5N1

(*) Notice: Subject to any disclaimer, the term of this patent is extended or adjusted under 35 U.S.C. 154(b) by 0 days.

(21) Appl. No.: 10/127,458

(22) Filed: Apr. 23, 2002

(51) Int. Cl.[7] .............................................. B65G 43/00
(52) U.S. Cl. ........................... 198/810.03; 198/810.01; 198/810.02; 198/810.04
(58) Field of Search ...................... 198/810.04, 810.1, 198/810.02, 810.03

(56) References Cited

U.S. PATENT DOCUMENTS

| | | | | |
|---|---|---|---|---|
| 4,062,442 A | * | 12/1977 | Schubert | 198/502 |
| 4,079,834 A | * | 3/1978 | Fletcher, Jr. et al. | 198/810 |
| 4,462,523 A | * | 7/1984 | Kerr | 198/810 |
| 5,347,348 A | * | 9/1994 | Nagata | 198/810 |
| 5,358,098 A | * | 10/1994 | Sundstrom et al. | 198/806 |
| 5,984,083 A | * | 11/1999 | Hosch et al. | 198/810.04 |
| 6,131,727 A | * | 10/2000 | Nelson | 198/810.02 |
| 6,431,348 B2 | * | 8/2002 | Malmberg | 198/810.03 |

FOREIGN PATENT DOCUMENTS

| | | | | |
|---|---|---|---|---|
| DE | 3333832 A1 | * | 4/1985 | 198/810.02 |
| DE | 3619528 A1 | * | 12/1987 | 198/810.02 |
| WO | WO87/02017 | * | 4/1987 | 198/810.01 |

* cited by examiner

*Primary Examiner*—Douglas Hess

(57) ABSTRACT

In industrial belted conveying systems, it is common to have a pull chord extending longitudinally along the conveyor, sometimes one chord on each side of the conveyor, said chord being attached to a trip mechanism, or safety switch. A number of serious accidents have occurred in the industry due to unprotected nip points at the return idlers under these conveyors. Accidents were the result of these pull chords not being easily accessible for manual activation of the safety features. In this invention, a primary pull chord is placed near the nip point, inserted through guides, and linked to one or more secondary longitudinal pull chord(s). The primary pull chord may be sleeved with a semi-rigid, pliable rod as additional support between the guides. Further, this semi-rigid rod may be encapsulated in a lightweight foamy tube to give it bulkiness. In the event of an inadvertent incident, the primary pull chord is entrained into the nip point, pulling the secondary longitudinal pull chord which then trips the safety switch, automatically disabling the conveyor drive.

4 Claims, 1 Drawing Sheet

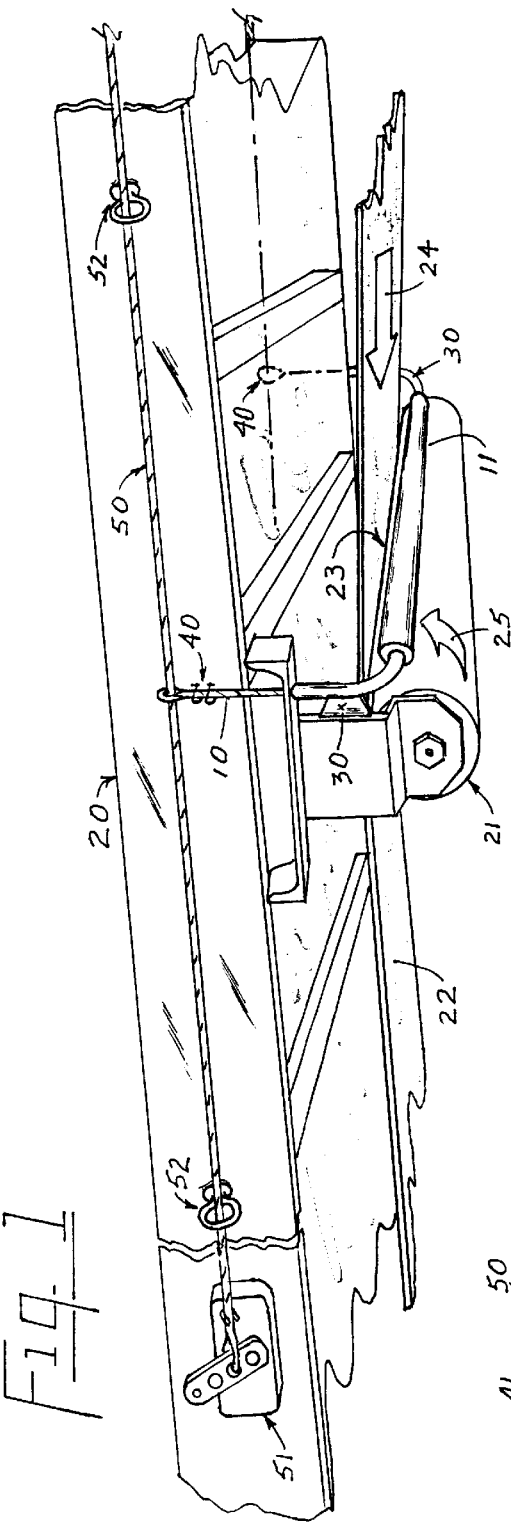
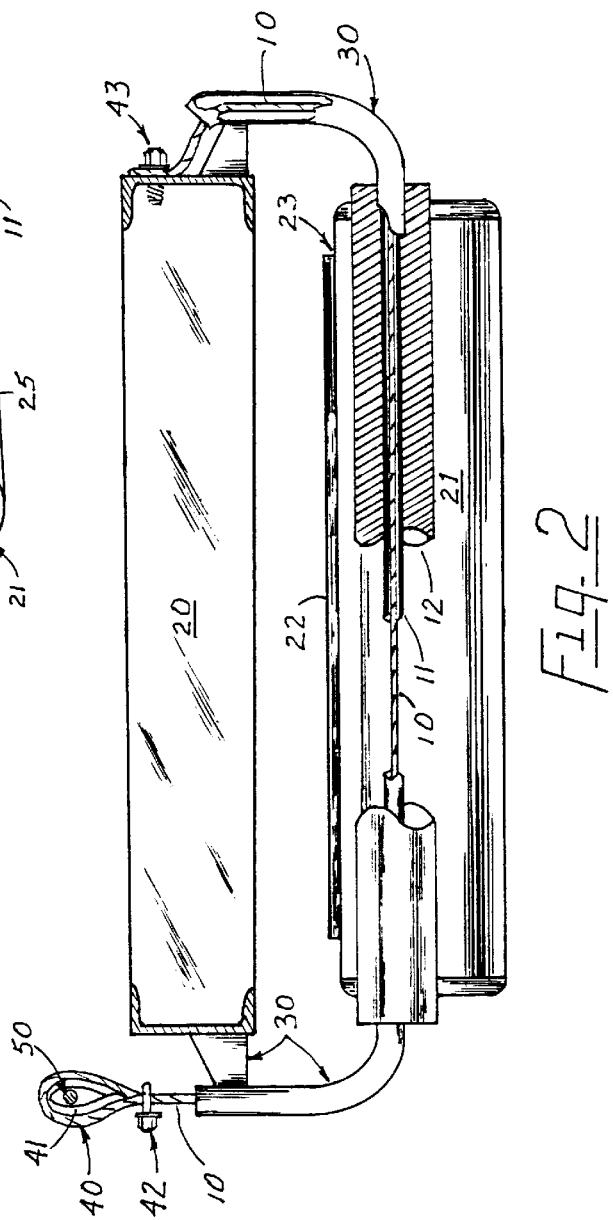

US 6,644,465 B1

CONVEYOR ROLLER NIP POINT AUTOMATIC PROTECTION DEVICE

BACKGROUND OF THE INVENTION

1. Field of the Invention

This invention relates generally to novel and advantageous improvements to belted conveyor safety devices. It is common to have a pull chord extending longitudinally along the side of industrial materials handling conveyors, sometimes one chord on each side of the conveyor. These chords are generally rigidly attached at one end, then threaded through the center of eyebolts along the length of the conveyor, and are finally fastened at the other end to a trip mechanism, or safety switch. These devices are un-affectionately known as 'Dead-Man Switches'.

2. Description of the Prior Art

There are various types of conveyor safety switching mechanisms on the market essentially comprising of a chord or cable operated type. However, all are presently manually-activated, to my knowledge. That is, they need to be pulled or actuated by an operator or attendant.

A person pulling on this chord activates the switch, which de-energizes the conveyor by opening the electrical circuit to the drive motor, thus stopping the conveyor belt. All are located along the sides of the conveyors.

SUMMARY OF THE INVENTION

A number of serious accidents have occurred in the industry which have resulted in injury, or worse, due to unprotected nip points at the return idlers under belted conveying systems. The nip point is the pressure point between the moving rubber belt and the return idler roller. It is analogous to the double-roller squeezing action of the antiquated wringer-washer. The return idlers are located cross-directionally to the belt travel, on the underside, or belly of the conveyor.

Extensive guarding, or barriers, could be installed to restrict access underneath these conveying structures while they are in operation. These barriers ultimately become inefficient in terms of safeguarding devices, especially when affecting housekeeping in these areas, because there is a likelihood of:

the barriers are inevitably opened or removed;

the guards are not replaced, or;

the guards are simply left open if they are hinged.

Tools (such as brooms, rakes, or shovels) and personal loose clothing can become entrained into these nip points. Although longitudinal pull chords and trip mechanisms are meant to be a protective device as a combination, chances are if and while an accident occurs, the casualty does not have the reach, or the thought process, to manually activate the tripping mechanism by pulling the longitudinal chords. Hence, these mechanisms are also not effective safeguarding devices.

In this invention, a simple, inexpensive, yet efficient device has been developed to minimize the risks of injuries with consideration to housekeeping requirements on the underside of belted conveyors.

I have found that the inaccessibility to, and the inefficient manual activation of the longitudinal pull chord can be easily overcome.

In this invention: a primary pull chord length is sleeved with a shorter semi-rigid support rod; this primary pull chord spans in parallel closely upstream of a conveyor return idler nip point; each end of the said pull chord is inserted through guides rigidly attached onto each side of said conveyor; at least one end of the primary pull chord is linked to a secondary pull chord, longitudinal to the conveyor, this secondary pull chord in turn is connected to a conveyor-disabling safety device; and the other end of the primary pull chord, if not attached to another secondary pull chord on the opposite side of the conveyor to the first secondary pull chord, it is then rigidly attached onto that opposite side of the conveyor.

Additionally, the semi-rigid support rod may be encapsulated in a lightweight foamy tube to give it bulkiness by increasing the surface area.

In the event of an incident, the primary pull chord, being close to the leading edge of the nip point, is automatically entrained into the nip point. The primary chord in turn draws the secondary longitudinal pull chord, which then trips the safety switch, thus effectively de-energizing the conveyor belt.

The added bulkiness of the lightweight foamy tube encapsulating the semi-rigid support rod improves the likelihood the primary pull chord will get entrained into the nip if an external force displaces it from its original position.

Although the intent of this device is to serve as a more efficient means of activation of the tripping mechanism, it is not meant to act as a barrier. If an incident does occur, this device will minimize the extent of the injury. It also serves as a more direct and accessible pull chord even if it is not actually entrained, for one reason or another, into the nip point.

It is an overall aim of the present invention to provide a conveyor belt nip point protection device.

It is also an aspect of this invention to provide a more efficient and automatic conveyor-tripping mechanism by providing a direct and accessible pull chord close to the nip point.

Yet another advantage of this invention is to afford a semi-rigid mechanism that can be reset into place after having been activated.

Still another aim of the present invention is for a product to be pliable with minimal replacement parts after having gone through the nip point a number of times.

Finally, one last objective of this invention is to offer a product that can be easily and inexpensively manufactured.

Other objects and advantages of the present invention may present themselves from the following description when considered with the accompanying drawings.

BRIEF DESCRIPTION OF THE DRAWINGS

FIG. 1 is a partial perspective view of one embodiment, and;

FIG. 2 is a more detailed elevation sectional view of another embodiment.

DESCRIPTION OF A PREFERRED EMBODIMENT

Referring now in more detail and by reference characters to the drawings which designate identical or corresponding practical embodiments of the invention throughout the several views, FIG. 1 illustrates a primary pull chord 10, which spans across a conveyor 20 and parallel to a return idler 21 for the conveyor belt 22, said primary chord spotted in close proximity upstream to the nip point 23 between the conveyor belt motion 24 and the return idler rotation 25.

The free-standing primary pull chord 10 would eventually droop downwards because of thermal variations, or age. As a preventative measure, the primary pull chord 10 is sleeved with a semi-rigid, yet pliable support rod 11.

Each end of the primary pull chord 10 is then reeved through a guide 30 rigidly attached to the side of the conveyor 20, until each end of the support rod 11 rests onto their respective guides 30.

Each end of the primary pull chord 10 is terminated by a hoop 40 around a thimble 41, held in place with one or more cable clips 42, as viewed in FIG. 2.

Still as depicted in FIG. 2, one end of the primary pull chord 10 is rigidly attached to one side of the conveyor by means of fasteners 43, and the other end of the primary pull chord 10 has a secondary pull chord 50 threaded through the eye of the hoop 40.

Likewise, each end of the secondary pull chord 50 is in turn terminated by a similar hoop 40, with one end rigidly fastened to one end of the conveyor 20.

Referring back to FIG. 1, the secondary pull chord 50 runs longitudinally along the conveyor 20, laced through strategically located eye-bolts 52. The other end of the secondary pull chord 50 is fastened to a conveyor-disabling safety device 51 at the other end of the conveyor 20.

Alternatively, and symmetrically as visible in FIG. 1, the hoop 40 at each end of the primary pull chord 10 could each be threaded with their own secondary pull chord 50 running longitudinally along each side of the conveyor 20, said individual secondary pull chords 50 fastened at one end of the conveyor 20, and the other end of these secondary pull chords 50 fastened to dual conveyor-disabling devices 51, one on each side at the other end of the conveyor 20.

Additionally, the semi-rigid rod 11 may be encapsulated with a lightweight foamy tube 12 in order to give extra bulkiness to the primary pull chord 10.

As a sequence: In the event of an incident, the primary pull chord 10 is entrained into the nip point 23 between the conveyor belt motion 24 and the return idler rotation 25, pulling the said primary pull chord's support rod 11 off or out of the guides 30. As the primary pull chord 10 is being drawn through the guides 30, it tugs on the secondary pull chord 50, which then trips the conveyor-disabling device 51, automatically.

Thus it has been described and illustrated a novel and unique belted conveyor roller nip point protection device which fulfills all of the associated objectives and advantages sought thereof.

It must be understood, although it is not shown or described, that other appendages may be incorporated to this embodiment with no deviations from the stated embodiment's intended purposes, these appurtenances serving either useful or cosmetic means:

a) The guides may be adapted to roller screened- or meshed-guards;

b) The guides or support rod may be adapted to roller drop-off guards or frames;

c) The same purpose may be achieved if the embodiment is placed on conveyor rollers other than the return idlers.

It should also be understood that any changes, modifications, variations, substitutions, or other applications or uses will become apparent to those skilled in the art upon consideration of this disclosure and its associated drawings.

It should further be understood that all changes, modifications, variations, substitutions, or any other applications or uses which do not depart from the scope and spirit of the invention are considered to be covered by the invention which is limited only by the accompanying claims.

What is claimed is:

1. A belted conveyor roller nip point automatic protection device comprising of a primary pull chord length, sleeved with a shorter semi-rigid pliable support rod; the primary pull chord spanning across the width of said conveyor, on the upstream side near any one of a conveyor belt's roller nip point; each end of the said primary pull chord is reeved through guides rigidly attached onto each side of said conveyor, until the ends of the support rod are resting onto their respective guides; one end of the primary pull chord is rigidly attached to one side of the conveyor; the other end of the primary pull chord is linked to a secondary pull chord longitudinal to, and on the opposite side of, the conveyor, this secondary pull chord in turn being connected to a conveyor-disabling safety device, for which, if the primary pull chord is inadvertently entrained into the nip point, it in turn draws on the secondary pull chord which then trips the safety device and automatically de-energizes the conveyor drive motor, stopping the belt.

2. A protection device as defined in claim 1, for which the primary chord semi-rigid pliable support rod is encapsulated with a lightweight foamy tube to give it bulkiness thereby increasing the surface area, and improve the likelihood it will get entrained into the nip if an external force displaces it from its original position.

3. A belted conveyor roller nip point automatic protection device comprising of a primary pull chord length, sleeved with a shorter semi-rigid pliable support rod; the primary pull chord spanning across the width of said conveyor, on the upstream side near any one of the conveyor belt's roller nip point; each end of the said primary pull chord is reeved through guides rigidly attached onto each side of said conveyor until the ends of the support rod are resting onto their respective guides; each end of the primary pull chord is linked to a secondary pull chord longitudinal to the conveyor, these secondary pull chords in turn being connected to a conveyor-disabling safety device, for which, if the primary pull chord is inadvertently entrained into the nip point, it in turn draws on the secondary pull chord which then trips the safety device and automatically de-energizes the conveyor drive motor, stopping the belt.

4. A protection device as defined in claim 3, for which the primary chord semi-rigid pliable support rod is encapsulated with a lightweight foamy tube to give it bulkiness thereby increasing the surface area, and improve the likelihood it will get entrained into the nip if an external force displaces it from its original position.

\* \* \* \* \*